US012413297B2

(12) United States Patent
Liu et al.

(10) Patent No.: US 12,413,297 B2
(45) Date of Patent: Sep. 9, 2025

(54) INFORMATION TRANSMISSION METHOD AND APPARATUS

(71) Applicant: HUAWEI TECHNOLOGIES CO., LTD., Shenzhen (CN)

(72) Inventors: Peng Liu, Shenzhen (CN); Huiming Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 18/327,631

(22) Filed: Jun. 1, 2023

(65) Prior Publication Data

US 2023/0308173 A1 Sep. 28, 2023

Related U.S. Application Data

(63) Continuation of application No. PCT/CN2021/133672, filed on Nov. 26, 2021.

(30) Foreign Application Priority Data

Dec. 2, 2020 (CN) .......................... 202011402829.6

(51) Int. Cl.
*H04B 7/01* (2006.01)
*H04B 7/185* (2006.01)
*H04J 13/00* (2011.01)

(52) U.S. Cl.
CPC ............. *H04B 7/1855* (2013.01); *H04B 7/01* (2013.01); *H04J 13/0029* (2013.01)

(58) Field of Classification Search
CPC ...... H04B 7/01; H04B 7/0617; H04B 7/1855; H04J 13/0029; H04W 16/28
See application file for complete search history.

(56) References Cited

U.S. PATENT DOCUMENTS 8,144,643 B2 * 3/2012 Miller ................ H04B 7/18541
370/321
8,218,476 B2 * 7/2012 Miller ................ H04B 7/18541
370/321

(Continued)

FOREIGN PATENT DOCUMENTS

| CN | 109788548 A | 5/2019 |
|---|---|---|
| CN | 110169095 A | 8/2019 |
| CN | 111565448 A | 8/2020 |

OTHER PUBLICATIONS

Nokia et al., "Doppler Compensation, Uplink Timing Advance and Random Access in NTN," 3rd Generation Partnership Project (3GPP), TSG WG1 #99, Mobile Competence Centre, 650, Route Des Lucioles, F-06921 Sophia-Antipolis Cedex, France, R1-1913017, XP051823750, Total 28 pages (Nov. 18-22, 2019).

(Continued)

*Primary Examiner* — Alpus Hsu
(74) *Attorney, Agent, or Firm* — Leydig, Voit & Mayer, Ltd.

(57) ABSTRACT

An information transmission method and apparatus are provided. A first communication apparatus determines feature information of a target channel and first common delay information, and determines scrambling information based on the feature information of the target channel. The first communication apparatus processes the first common delay information based on the scrambling information, to obtain second common delay information. The first communication apparatus sends the second common delay information through the target channel. A second communication apparatus receives the second common delay information through the target channel, and determines the feature information of the target channel. The second communication apparatus determines descrambling information based on information of the target channel, and further processes the (Continued)

second common delay information based on the descrambling information to obtain the first common delay information.

20 Claims, 6 Drawing Sheets

(56) References Cited

U.S. PATENT DOCUMENTS

| | | | | |
|---|---|---|---|---|
| 9,930,685 | B2* | 3/2018 | Agarwal | H04W 76/28 |
| 2006/0106309 | A1* | 5/2006 | Liu | G01S 7/52095 |
| | | | | 600/447 |
| 2019/0313389 | A1* | 10/2019 | John Wilson | H04W 72/21 |

OTHER PUBLICATIONS

"3rd Generation Partnership Project; Technical Specification Group Radio Access Network; NR; Physical channels and modulation, (Release 15)," 3GPP TS 38.211 V15.6.0, Total 97 pages (Jun. 2019).

Renaud-Alexandre-Pitaval et al., "Overcoming 5G Prach Capacity Shortfall by Combining Zadoff-Chu and M- Sequences," 2018 IEEE International Conference on Communications (ICC), XP033378132, Total 6 pages (May 20, 2018).

"3rd Generation Partnership Project; Technical Specification Group Radio Access Network; Study on New Radio (NR) to support non-terrestrial networks (Release 15)," 3GPP TR 38.811 V15.1.0, Total 126 pages (Jun. 2019).

Meoiatek Inc., "PRACH design for NTN scenario," 3GPP TSG-RAN WG1 #98bis, R1-1909983, Mobilecompetence Centre, 650, Route Des Lucioles, F-06921 Sophia-Antipolis Cedex, France, Chongqing, China, XP051808061, Total 14 pages (Oct. 14-20, 2019).

"3rd Generation Partnership Project; Technical Specification Group Radio Access Network; Solutions for NR to support non-terrestrial networks (NTN)(Release 16)," 3GPP TR 38.821 V16.0.0, Total 140 pages (Dec. 2019).

NEC, "Synchronization mechanism for NR sidelink," 3GPP TSG RAN WG1 #96bis, Xi'an, China, R1-1904655, Total 5 pages (Apr. 8-12, 2019).

"Discussion on the TA and PRACH for the NTN," 3GPP TSG RAN WG1 #96bis, TSG WG1 #96bis, R1-1904767, ZTE, Total 5 pages (Apr. 8-12, 2019).

"On Timing Advance in NTN," 3GPP TSG RAN WG1 Meeting #96bis, Xi'an, China, R1-1905180, Thales, Total 15 pages (Apr. 7-13, 2019).

"Doppler Compensation, Uplink Timing Advance and Random Access in NTN," 3GPP TSG RAN WG1 #99, Reno, USA, R1-1913017, XP051823750, total 28 pages, 3GPP—3rd Generation Partnership Project, Valbonne, France (Nov. 18-22, 2019).

Pitaval et al., "Overcoming 5G PRACH Capacity Shortfall by Combining Zadoff-Chu and M-Sequences," XP033378132, 2018 IEEE International Conference on Communications (ICC), total 6 pages, IEEE—Institute of Electrical and Electronics Engineers, New York, New York (May 20, 2018).

"PRACH design for NTN scenario", 3GPP TSG-RAN WG1 #98bis Meeting, Chongqing, China, R1-1909983, XP051808061, total 14 pages, 3GPP—3rd Generation Partnership Project, Valbonne, France (Oct. 14-20, 2019).

* cited by examiner

| Index value | $\varphi(0), ..., \varphi(17)$ | | | | | | | | | | | | | | | | | |
|---|---|---|---|---|---|---|---|---|---|---|---|---|---|---|---|---|---|---|
| 0 | ... | ... | ... | ... | ... | ... | ... | ... | ... | ... | ... | ... | ... | ... | ... | ... | ... | ... |
| 1 | ... | ... | ... | ... | ... | ... | ... | ... | ... | ... | ... | ... | ... | ... | ... | ... | ... | ... |
| 2 | ... | ... | ... | ... | ... | ... | ... | ... | ... | ... | ... | ... | ... | ... | ... | ... | ... | ... |
| 3 | ... | ... | ... | ... | ... | ... | ... | ... | ... | ... | ... | ... | ... | ... | ... | ... | ... | ... |
| 4 | ... | ... | ... | ... | ... | ... | ... | ... | ... | ... | ... | ... | ... | ... | ... | ... | ... | ... |
| 5 | 3 | −3 | 1 | 1 | 3 | −1 | −1 | −1 | −1 | −3 | 1 | 1 | −1 | 3 | 3 | −3 | 3 | 1 |
| 6 | ... | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... | ... |

INFORMATION TRANSMISSION METHOD AND APPARATUS

CROSS-REFERENCE TO RELATED APPLICATIONS

This application is a continuation of International Application No. PCT/CN2021/133672, filed on Nov. 26, 2021, which claims priority to Chinese Patent Application No. 202011402829.6, filed on Dec. 2, 2020. The disclosures of the aforementioned applications are hereby incorporated by reference in their entireties.

TECHNICAL FIELD

This application relates to the field of mobile communication technologies, and in particular, to an information transmission method and an apparatus.

BACKGROUND

A satellite mobile communication system not only meets a plurality of service requirements, but also provides wider service coverage. Satellites provide wide-area coverage communication services for terrestrial terminal device due to features such as long communication distance, wide coverage, flexible networking, and no restriction from geographical environment conditions or terrestrial device conditions. Therefore, the satellite mobile communication system plays an important role in the field of wireless communication.

In the satellite mobile communication system, different terminal devices in a same cell are located at different positions, and therefore have different one-way transmission delays with satellites, so that the different terminal devices interfere with each other during satellite communication. In addition, in a current non-terrestrial network (NTN), a one-way transmission delay between a satellite (which may also be understood as a base station) and a terminal device is at least 66.7 µs to 120 ms. The transmission delay cannot meet a maximum delay that can be indicated by a terminal device when the terminal device initially accesses a communication system in a fifth generation radio access network, that is, a new radio (NR) network.

In an existing uplink synchronization technology, the satellite transmits common delay information to a terminal device that is within a coverage of a beam of the satellite, to resolve the foregoing problem. However, when the satellite transmits the common delay information to the terminal device that is within the coverage of the beam of the satellite, some risks usually exist. As a result, the terminal device cannot correctly receive the common delay information, and cannot accurately access the satellite for communication.

SUMMARY

This application provides an information transmission method and an apparatus, to ensure accuracy of transmission of common delay information in an NTN system, so that a second communication apparatus accurately accesses a satellite for communication.

According to a first aspect, an embodiment of the present invention provides an information transmission method. The method includes the following steps: A first communication apparatus determines feature information of a target channel and first common delay information. The first common delay information is minimum common delay information transmitted between the first communication apparatus and a second communication apparatus located within a coverage of a beam of the first communication apparatus. The first communication apparatus determines scrambling information of the first common delay information based on the feature information of the target channel. The first communication apparatus processes the first common delay information based on the scrambling information, to obtain second common delay information. The first communication apparatus sends the second common delay information through the target channel.

According to this design, the first communication apparatus may determine the scrambling information based on the feature information of the target channel, process to-be-sent first common delay information by using the scrambling information to obtain the second delay information, and then send the second common delay information through the target channel. In this solution, the first communication apparatus determines the scrambling information of the first common delay information by using the channel feature information, to ensure that the first delay information sent by the first communication apparatus is not interfered by another channel in a transmission process, so that the second communication apparatus can receive accurate first common delay information through the channel.

In a possible design, that a first communication apparatus determines feature information of a target channel includes: The first communication apparatus obtains direction information and/or Doppler information of the beam, and determines the feature information of the target channel based on the direction information and/or the Doppler information of the beam.

According to this design, the first communication apparatus may flexibly and effectively determine the feature information of the target channel based on the direction information and/or the Doppler information of the beam of the first communication apparatus.

In a possible design, that the first communication apparatus determines scrambling information of the first common delay information based on the feature information of the target channel includes: The first communication apparatus determines the scrambling information of the first common delay information based on a gold sequence included in preset scrambling code sequence information. An initial value of the Gold sequence is determined based on the feature information of the target channel and identification information of a cell in which the second communication apparatus is located.

According to this design, the first communication apparatus may determine, based on the determined feature information of the target channel and the identification information of the cell in which the second communication apparatus is located, the initial value of the Gold sequence included in the preset scrambling code sequence information, and then determine the scrambling information of the first common delay information based on the Gold sequence. In this solution, the first communication apparatus determines that the scrambling information of the first common delay information is related to the feature information of the target channel, to ensure that delay information processed by using the scrambling information is not easily interfered by another channel in a transmission process, and the second communication apparatus may also accurately obtain the first common delay information based on the feature information of the target channel.

In a possible design, the preset scrambling code sequence information includes an N-bit Gold sequence, where N is a positive integer. That the first communication apparatus determines the scrambling information of the first common delay information based on the Gold sequence includes:

The first communication apparatus determines that the first common delay information includes M bits, and M is an integer greater than 0. The first communication apparatus determines an M-bit Gold sequence from the N-bit Gold sequence, and uses the M-bit Gold sequence as a scrambling sequence of the first common delay information.

According to this design, the first communication apparatus accurately selects a scrambling sequence with a corresponding quantity of bits from the Gold sequence based on a quantity of bits included in the first common delay information, to fully utilize the scrambling sequence without generating waste of an additional sequence.

In a possible design, that the first communication apparatus determines scrambling information of the first common delay information based on the feature information of the target channel includes: The first communication apparatus determines the scrambling information of the first common delay information based on the feature information of the target channel, a preset first lookup table, and a preset first sequence formula.

According to this design, the first communication apparatus may determine the scrambling information of the first common delay information based on the determined feature information of the target channel, and through the preset first lookup table and the preset first sequence formula. Therefore, it may be ensured that the first common delay information sent by the first communication apparatus is not interfered by another channel in a transmission process, so that the second communication apparatus can accurately receive the first common delay information through the target channel.

In a possible design, that the first communication apparatus determines the scrambling information of the first common delay information based on the feature information of the target channel, a preset first lookup table, and a preset first sequence formula includes: The first communication apparatus determines, based on a quantity M of bits included in the first common delay information, that a scrambling sequence of the first common delay information needs to include M bits, where M is a positive integer. The first communication apparatus determines, based on that the scrambling sequence of the first common delay information needs to include M bits, that a length of the preset first lookup table is M, where the preset first lookup table includes correspondences between different index values and different preset $\phi(m)$ values, each index value corresponds to M different preset $\phi(m)$ values, and m is a positive integer less than or equal to M. The first communication apparatus determines, based on the feature information of the target channel, that a corresponding index value in the preset first lookup table is i, where i is a positive integer. The first communication apparatus determines, in the preset first lookup table, M different preset $\phi(m)$ values corresponding to the index value i. The first communication apparatus respectively substitutes the M different preset $\phi(m)$ values corresponding to the index value i into the preset first sequence formula, to obtain M sequence values r(m) through calculation, and uses the M sequence values r(m) as an M-bit scrambling sequence of the first common delay information. The preset first sequence formula meets the following:

$$r(m)=e^{j\phi(m)\pi/4}.$$

j is used to represent an imaginary unit in an exponential form of a complex number, and r(m) represents an $m^{th}$ sequence value.

According to this design, the first communication apparatus determines, based on the feature information of the target channel, a scrambling sequence that has a corresponding quantity of bits equal to the quantity of bits included in the first common delay information, to fully utilize the scrambling sequence without generating waste of an additional sequence.

In a possible design, the scrambling information includes the scrambling sequence of the first common delay information; and that the first communication apparatus processes the first common delay information based on the scrambling information, to obtain second common delay information includes: The first communication apparatus scrambles the first common delay information by using the scrambling sequence of the first common delay information, to obtain the second common delay information.

According to this design, the first communication apparatus may directly scramble the first common delay information through the scrambling sequence included in the scrambling information, to obtain the second common delay information, to ensure security of transmission of the common delay information of the first communication apparatus.

In a possible design, that the first communication apparatus processes the first common delay information based on the scrambling information, to obtain second common delay information includes: The first communication apparatus obtains a digital signature based on the scrambling information and the first common delay information, and uses the digital signature and the first common delay information as the second common delay information; or the first communication apparatus obtains a digital signature based on the scrambling information and the feature information of the target channel, and uses the digital signature and the first common delay information as the second common delay information.

According to this design, the first communication apparatus obtains the digital signature based on the scrambling information and with reference to the first common delay information or the feature information of the target channel, uses the digital signature and the first delay information together as the second delay information, and sends the second delay information through the target channel. The digital signature may indicate a source of the second delay information. In addition, when receiving the second delay information, the second communication apparatus performs determining by using the digital signature, to ensure that the received second delay information is sent by the first communication apparatus, and to obtain accurate first delay information.

According to a second aspect, an embodiment of this application provides an information transmission method. The method includes the following steps: A second communication apparatus receives, through a target channel, second common delay information sent by a first communication apparatus, and determines feature information of the target channel. The second communication apparatus determines descrambling information based on the feature information of the target channel. The second communication apparatus processes the second common delay information based on the descrambling information, to obtain first common delay information, where the first common delay information is minimum common delay information transmitted between the first communication apparatus and a second communication apparatus located within a coverage of a beam of the first communication apparatus.

According to this design, the second communication apparatus determines corresponding descrambling information based on the feature information of the target channel, and processes the received second common delay information by using the descrambling information to obtain the first delay information. In this solution, the second communication apparatus determines the descrambling information of the second common delay information based on channel feature information of a target channel that is the same as that of the first communication apparatus, to ensure accuracy of obtaining, by the second communication apparatus, the first common delay information sent by the first communication apparatus.

In a possible design, that the second communication apparatus determines the feature information of the target channel includes: The second communication apparatus sends a reference signal to the first communication apparatus through the target channel, and measures the target channel, to obtain a measurement result of the target channel; and the second communication apparatus determines the feature information of the target channel based on the measurement result of the target channel.

According to this design, the second communication apparatus flexibly and effectively determines the feature information of the target channel by measuring a target channel on which the second common delay information is transmitted.

In a possible design, that the second communication apparatus determines descrambling information of the second common delay information based on the feature information of the target channel includes: The second communication apparatus determines the descrambling information of the second common delay information based on a gold Gold sequence included in preset scrambling code sequence information. An initial value of the Gold sequence is determined based on the feature information of the target channel and identification information of a cell in which the second communication apparatus is located.

According to this design, the second communication apparatus also determines, based on the determined feature information of the target channel and the identification information of the cell in which the second communication apparatus is located, the initial value of the Gold sequence included in the preset scrambling code sequence information. The second communication apparatus may determine, based on the Gold sequence, accurate descrambling information of the second common delay information, and then the second communication apparatus can correctly process the second common delay information based on the descrambling information, to obtain accurate first common delay information.

In a possible design, the preset scrambling code sequence information includes an N-bit Gold sequence, where N is a positive integer. That the second communication apparatus determines the descrambling information based on a Gold sequence included in preset scrambling code sequence information includes: The second communication apparatus determines that the first common delay information includes M bits, where M is a positive integer; and the second communication apparatus determines an M-bit Gold sequence from the N-bit Gold sequence, and uses the M-bit Gold sequence as a descrambling sequence.

According to this design, the second communication apparatus accurately obtains a descrambling sequence with a corresponding quantity of bits from the Gold sequence based on a quantity of bits included in the second common delay information, to fully utilize the descrambling sequence without generating waste of an additional sequence.

In a possible design, that the second communication apparatus determines descrambling information based on the feature information of the target channel includes: The second communication apparatus determines the descrambling information based on the feature information of the target channel, a preset first lookup table, and a preset first sequence formula.

According to this design, the second communication apparatus may determine correct descrambling information based on the determined feature information of the target channel and through the preset first lookup table and first sequence formula. Then the second communication apparatus may correctly process the second common delay information based on the descrambling information, to obtain accurate first common delay information.

In a possible design, that the second communication apparatus determines the descrambling information based on the feature information of the target channel, a preset first lookup table, and a preset first sequence formula includes: The second communication apparatus determines, based on a quantity M of bits included in the first common delay information, that a descrambling sequence needs to include M bits, where M is a positive integer. The second communication apparatus determines, based on that the descrambling sequence needs to include M bits, that a length of the preset first lookup table is M, where the preset first lookup table includes correspondences between different index values and different preset φ(m) values, each index value corresponds to M different preset φ(m) values, and m is a positive integer less than or equal to M. The second communication apparatus determines, based on the feature information of the target channel, that a corresponding index value in the preset first lookup table is i, where i is a positive integer. The second communication apparatus determines, in the preset first lookup table, M different preset φ(m) values corresponding to the index value i. The second communication apparatus respectively substitutes, the M different preset φ(m) values corresponding to the index value i into the preset first sequence formula, to obtain M sequence values r(m) through calculation, and uses the M sequence values r(m) as an M-bit descrambling sequence. The preset first sequence formula meets the following:

$$r(m)=e^{j\phi(m)\pi/4}.$$

j is used to represent an imaginary unit in an exponential form of a complex number, and r(m) represents an $m^{th}$ sequence value.

According to this design, the second communication apparatus determines, based on the feature information of the target channel, a descrambling sequence that has a corresponding quantity of bits equal to the quantity of bits included in the first common delay information, to fully utilize the descrambling sequence without generating waste of an additional sequence.

In a possible design, the descrambling information includes the descrambling sequence. That the second communication apparatus processes the second common delay information based on the descrambling information, to obtain first common delay information includes: The second communication apparatus descrambles the second common delay information by using the descrambling sequence, to obtain the first common delay information.

According to this design, the second communication apparatus may directly descramble the second common delay information through the descrambling sequence included in the descrambling information, to obtain correct first common delay information.

In a possible design, the second common delay information includes delay information and a first digital signature, and the descrambling information includes a descrambling sequence. That the second communication apparatus processes the second common delay information based on the descrambling information, to obtain first common delay information includes: The second communication apparatus uses the descrambling sequence as a scrambling sequence of the delay information. The second communication apparatus generates a second digital signature based on the delay information and the scrambling sequence of the delay information, or the second communication apparatus generates a second digital signature based on the feature information of the target channel and the scrambling sequence of the delay information. When the second digital signature is the same as the first digital signature, the second communication apparatus determines that delay information included in the second common delay information is the first common delay information.

According to this design, the second communication apparatus obtains a new digital signature based on the descrambling information and with reference to the delay information in the second common delay information or the feature information of the target channel, and compares the new digital signature with the first digital signature in the second common delay information, to determine whether the new digital signature is consistent with the first digital signature in the second common delay information, and then to accurately determine that the first common delay information is the delay information in the second common delay information.

According to a third aspect, this application provides an information transmission apparatus. The apparatus may serve as a first communication apparatus, and has a function for implementing the method in the first aspect or in any one of possible designs of the first aspect. The function may be implemented by hardware, or may be implemented by hardware executing corresponding software. The hardware or the software includes one or more modules corresponding to the function, such as a processing unit and a communication unit.

The processing unit is configured to determine feature information of a target channel and first common delay information. The first common delay information is minimum common delay information transmitted between the first communication apparatus and a second communication apparatus located within a coverage of a beam of the first communication apparatus. The processing unit is further configured to determine scrambling information of the first common delay information based on the feature information of the target channel, and process the first common delay information based on the scrambling information, to obtain second common delay information.

The communication unit is configured to send the second common delay information through the target channel.

According to a fourth aspect, this application provides an information transmission apparatus. The apparatus may serve as a second communication apparatus, and has a function for implementing the method in the second aspect or in any one of possible designs of the second aspect. The function may be implemented by hardware, or may be implemented by hardware executing corresponding software. The hardware or the software includes one or more modules corresponding to the function, such as a processing unit and a communication unit.

The communication unit is configured to receive, through a target channel, second common delay information sent by a first communication apparatus, and determine feature information of the target channel.

The processing unit is configured to determine descrambling information based on the feature information of the target channel, and the processing unit is further configured to process the second common delay information based on the descrambling information, to obtain first common delay information, where the first common delay information is minimum common delay information transmitted between the first communication apparatus and a second communication apparatus located within a coverage of a beam of the first communication apparatus.

According to a fifth aspect, an embodiment of this application further provides a computer storage medium. The storage medium stores a software program, and when the software program is read and executed by one or more processors, the method provided in the first aspect or any design of the first aspect may be implemented, or the method provided in the second aspect or any design of the second aspect may be implemented.

According to a sixth aspect, an embodiment of this application further provides a computer program product including instructions. When the computer program product is run on a computer, the method provided in the first aspect or any design of the first aspect is performed, or the method provided in the second aspect or any design of the second aspect is performed.

According to a seventh aspect, an embodiment of this application provides a chip system. The chip system includes a processor, and the processor is configured to support a first communication apparatus to implement a function in the first aspect, or configured to support a second communication apparatus to implement a function in the second aspect.

In a possible design, the chip system further includes a memory. The memory is configured to store program instructions and data necessary to the second communication apparatus. The chip system may include a chip, or may include a chip and another discrete component.

According to an eighth aspect, an embodiment of this application further provides a communication system. The communication system includes a first communication apparatus configured to perform the method provided in the first aspect or any design of the first aspect, a second communication apparatus configured to perform the method provided in the second aspect or any design of the second aspect, and a transmission channel configured to implement communication between the first communication apparatus and the second communication apparatus.

According to a ninth aspect, an embodiment of this application further provides a communication apparatus. The communication apparatus includes an input/output interface and a logic circuit, and the input/output interface may be configured to output first beam configuration information when used in the first communication apparatus configured to perform the method provided in the first aspect or any design of the first aspect. In a possible design, the input/output interface may be further configured to obtain second beam configuration information sent by a core network element. The logic circuit may be configured to determine the first beam configuration information.

According to a tenth aspect, an embodiment of this application further provides a communication apparatus, and the communication apparatus includes an input/output interface and a logic circuit. When the input/output interface is used in the second communication apparatus configured to perform the method provided in the second aspect or any design of the second aspect, the input/output interface may be configured to input first beam configuration information. In a possible design, the input/output interface may be further configured to output a random access request. The logic circuit may be configured to determine a first beam mode based on the first beam configuration information, and may be configured to communicate with a second communication apparatus based on the first beam mode.

For technical effects that may be achieved in the third aspect to the tenth aspect, refer to descriptions of technical effects that may be achieved by any design in the first aspect or the second aspect. Details are not described herein again.

DESCRIPTION OF EMBODIMENTS

Figure 1A:
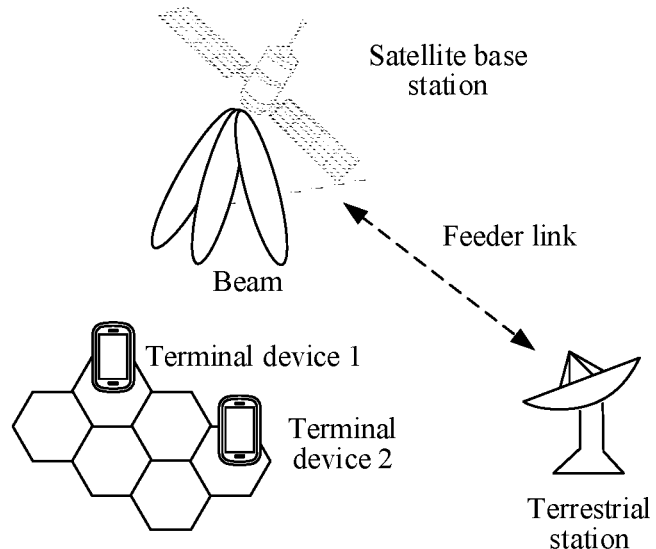
FIG. 1A is a schematic diagram of a satellite mobile communication system applied in an embodiment of the present invention.

The following describes technical solutions in embodiments of this application with reference to accompanying drawings in embodiments of this application.

In the following, some terms used in embodiments of this application are explained, to facilitate understanding of those skilled in the art.

(1) A first communication apparatus in an embodiment of this application may be a network device, or may be an apparatus that can support the network device in implementing a function of the network device, for example, a chip system. The apparatus may be installed in the network device.

The network device may be a non-terrestrial communication device in a non-terrestrial network (NTN), and the non-terrestrial communication device may communicate with a terrestrial device (for example, a second communication apparatus), to provide a wide-area coverage communication service for the terrestrial device.

The non-terrestrial communication device in this embodiment of this application, for example, a satellite, may serve as an access point of the terrestrial device, and is similar to a base station in a terrestrial mobile communication system, for example, a base station in a long term evolution (LTE)/NR network. The satellite may communicate with the second communication apparatus through a wireless signal, and a communication protocol involved in the communication may be any one of terrestrial mobile communication protocols and a protocol variant thereof. This is not specifically limited in this application.

It should be noted that, the first communication apparatus (the network device) in this embodiment of this application may alternatively be a communication device in the terrestrial mobile communication system, for example, an access device. The access device may be an evolved NodeB (eNB or eNodeB) in LTE, or a base station in a 5G network or a public land mobile network (public land mobile network, PLMN), a broadband network gateway (broadband network gateway, BNG), an aggregation switch or a non-third generation partnership project (3rd generation partnership project, 3GPP) access device, or the like. This is not specifically limited in this embodiment of this application. Optionally, a base station in this embodiment of this application may include base stations in various forms, for example, a macro base station, a micro base station (also referred to as a small cell), a relay station, an access point, a next-generation base station (gNodeB, gNB), a transmitting and receiving point (TRP), a transmitting point (transmitting point, TP), a mobile switching center, and a device that functions as a base station in communication such as device-to-device (D2D), vehicle-to-everything (vehicle-to-everything, V2X), and machine-to-machine (M2M). This is not specifically limited in this embodiment of this application.

(2) A second communication apparatus in an embodiment of this application may be a terminal device, or may be an apparatus that can support the terminal device in implementing a function of the terminal device, for example, a chip system. The apparatus may be installed in the terminal device. In this embodiment of this application, the chip system may include a chip, or may include a chip and another discrete component.

In the technical solutions provided in this embodiment of this application, the terminal device may be used as an example to describe the technical solutions provided in this embodiment of this application, to implement a function of the second communication apparatus.

The terminal device may be referred to as a terminal for short, and is also referred to as user equipment (UE). The terminal device is an entity located on a user side and configured to receive or transmit a signal, for example, mobile phone UE. The terminal device may also be referred to as a terminal, user equipment (UE), a mobile station (mobile station, MS), a mobile terminal (MT), or the like. The terminal device may be a mobile phone, a tablet computer (Pad), a computer having a wireless receiving and transmitting function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. Alternatively, the terminal device may be fixed or mobile. A specific technology and a specific device form that are used by the terminal device are not limited in embodiments of this application.

(3) A beam in an embodiment of this application may be in a shape formed on an earth surface by an electromagnetic wave emitted by an antenna of a satellite device, and just like a beam of a flashlight, has a specific range, such as a global beam, a dot beam, or a shaped beam. In addition, the shape of the beam is determined by a transmit antenna of the satellite device.

(4) Scrambling information in an embodiment of this application may be scrambling/encryption information mutually agreed upon during communication between different devices, or specific scrambling/encryption information determined for feature information involved in communication between different devices, and is mainly used for performing encryption or anti-interference processing on to-be-transmitted specific signal or information, or data, to prevent transmission errors or easy access and use by another device. For example, a sending device serving as a sending end may perform scrambling or encryption processing on to-be-sent signal, information, or data by using the specific scrambling information, to ensure that only a receiving device corresponding to the sending device can use the signal, information, or data.

Descrambling information in this embodiment of this application may be descrambling/decryption information mutually agreed upon during communication between different devices, or specific descrambling/decryption information determined for feature information involved in communication between different devices. The descrambling information corresponds to the scrambling information, and is mainly used to perform descrambling/decrypting processing on to-be-transmitted encrypted/scrambled specific signal, information, or data, to accurately obtain descrambled/decrypted specific signal, information, or data. Descrambling/decrypting and scrambling/encrypting are inverse operations.

(5) "A plurality of" in an embodiment of this application refers to greater than or equal to two.

In addition, it should be understood that, in descriptions of this application, terms such as "first" and "second" are merely used for purposes of distinguishing descriptions and are neither intended to indicate or imply relative importance nor intended to indicate or imply a sequence.

FIG. 1A is a schematic diagram of an architecture of a satellite mobile communication system applicable in an embodiment of this application. As shown in FIG. 1A, in the satellite mobile communication system, a satellite base station communicates with a terminal device (for example, a terminal device 1 and a terminal device 2 in a same cell) through a wireless signal, and a communication protocol may be any one of terrestrial mobile communication protocols and a variant thereof. The satellite base station is wirelessly connected to a ground station. This link is usually called a feeder link and provides data backhaul. The satellite base station usually forms a plurality of beams, and each beam is similar to a cell/sector in a terrestrial mobile communication system (for example, LTE/NR).

Figure 1B:
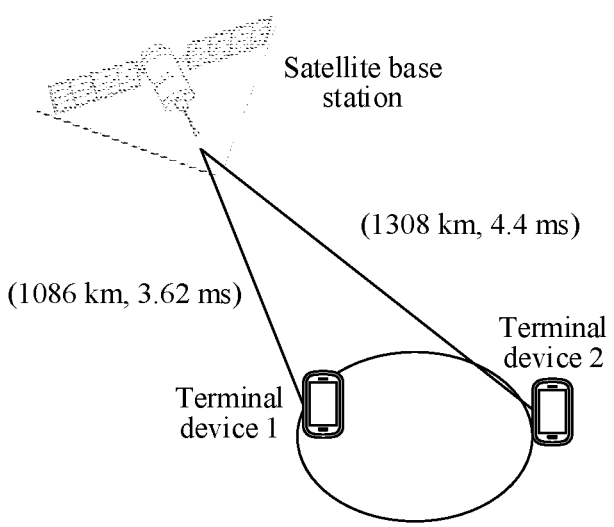
FIG. 1B is a schematic diagram of a propagation delay between a terminal device and a satellite base station according to an embodiment of the present invention.

A same cell includes a plurality of terminal devices, for example, a terminal device 1 and a terminal device 2, and a distance between the terminal device 1 and the satellite base station is different from a distance between the terminal device 2 and the satellite base station. Therefore, a one-way transmission delay between the terminal device 1 and the satellite base station is also different from a one-way transmission delay between the terminal device 2 and the satellite base station. As shown in FIG. 1B, the distance and the one-way transmission delay between the terminal device 1 and the satellite base station are respectively 1086 km and 3.62 ms. The distance and the one-way transmission delay between the terminal device 2 and the satellite base station are respectively 1308 km and 4.4 ms. Therefore, the terminal device 1 and the terminal device 2 interfere with each other when respectively communicating with the satellite base station. In addition, in a current non-terrestrial network NTN, a one-way transmission delay between the satellite base station and the terminal device is at least 66.7 μs to 120 ms. Apparently, the transmission delay cannot meet a maximum delay that can be indicated by a terminal device when the terminal device initially accesses a communication system in an existing NR network.

Figure 1C:
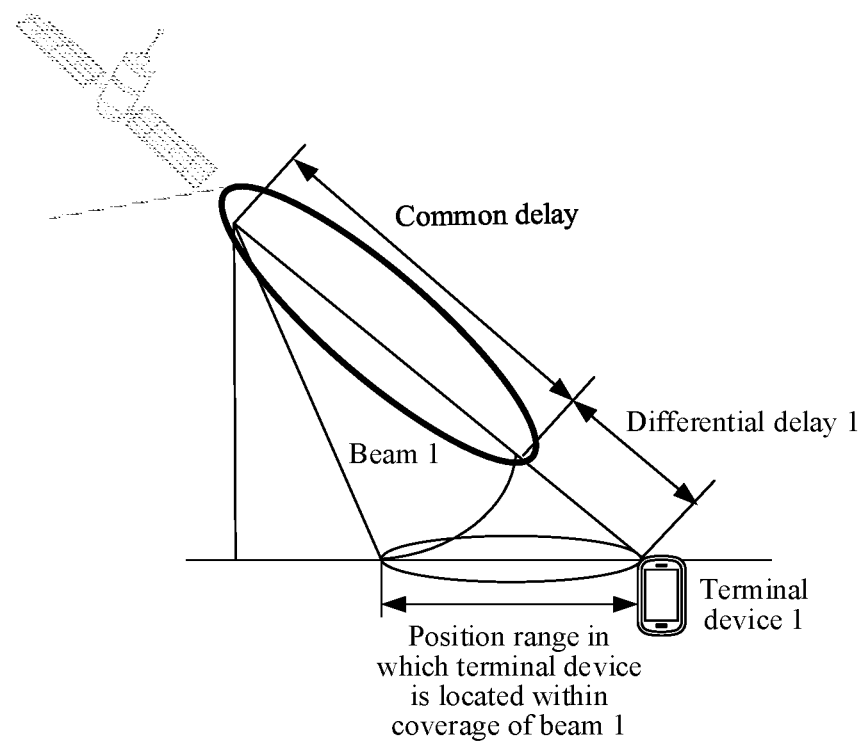
FIG. 1C is a schematic diagram of an uplink synchronization technology applied in an embodiment of the present invention.

In the prior art, by using an uplink synchronization technology, a delay of arriving at the satellite base station by the terminal device 1 is almost the same as a delay of arriving at the satellite base station by the terminal device 2. In the uplink synchronization technology, a one-way transmission delay between a terminal device within a same beam range of a satellite base station and the satellite base station is mainly classified into a common delay and a differential delay. As shown in FIG. 1C, a common delay is a minimum common delay of transmission between a terminal device within a coverage of a beam and a satellite base station, and a differential delay depends on an actual position of the terminal device. Therefore, each terminal device may determine a common delay based on received common delay information, and subtract the received common delay from a total transmission delay to obtain a differential delay. Then, when the terminal device sends, to the satellite base station, a random access preamble (Random Access Preamble, RA Preamble) for requesting access, pre-compensation may be performed based on a differential delay of the terminal device, to ensure that the terminal device accesses the satellite base station to implement communication.

However, in the prior art, when the satellite base station transmits the common delay information to a terminal device within a coverage of a beam of the satellite base station, some risks usually exist. As a result, the terminal device cannot receive correct common delay information, and further, the terminal device cannot accurately access a satellite for communication. For example, when a pseudo satellite transmits a same downlink synchronization sequence and system information that includes incorrect common delay information to a terminal device within a coverage of a beam of an authorized satellite, the terminal device within the coverage of the beam of the authorized satellite cannot accurately access the authorized satellite for communication.

It should be noted that, this application is not limited to the common delay information that is transmitted between the satellite and the terminal device, and may be other broadcast information, or the like. This is not specifically limited in this application. In addition, in this application, when information is transmitted between another communication apparatus in a non-terrestrial network or a communication apparatus in a terrestrial network and a terrestrial terminal device, the terminal device cannot receive correct information because information transmission security is low.

Therefore, an embodiment of this application provides an information transmission method. In the method, a first communication apparatus first determines feature information of a target channel and first common delay information, and then determines scrambling information of the first common delay information based on the feature information of the target channel. Then, the first communication apparatus processes the first common delay information based on the scrambling information, to obtain second common delay information. Finally, the first communication apparatus sends the second common delay information through the target channel. After receiving the second common delay information through the target channel, a second communication apparatus measures the target channel, to obtain the feature information of the target channel, then determines descrambling information based on the feature information of the target channel, and further processes the second common delay information based on the descrambling information to obtain the first common delay information. In this solution, both the first communication apparatus and the second communication apparatus determine corresponding scrambling information and descrambling information based on channel feature information between the first communication apparatus and the second communication apparatus, to ensure security of transmission of the first common delay information, and ensure that the second communication apparatus receives correct first common delay information, to accurately access the first communication apparatus for communication.

Figure 2:
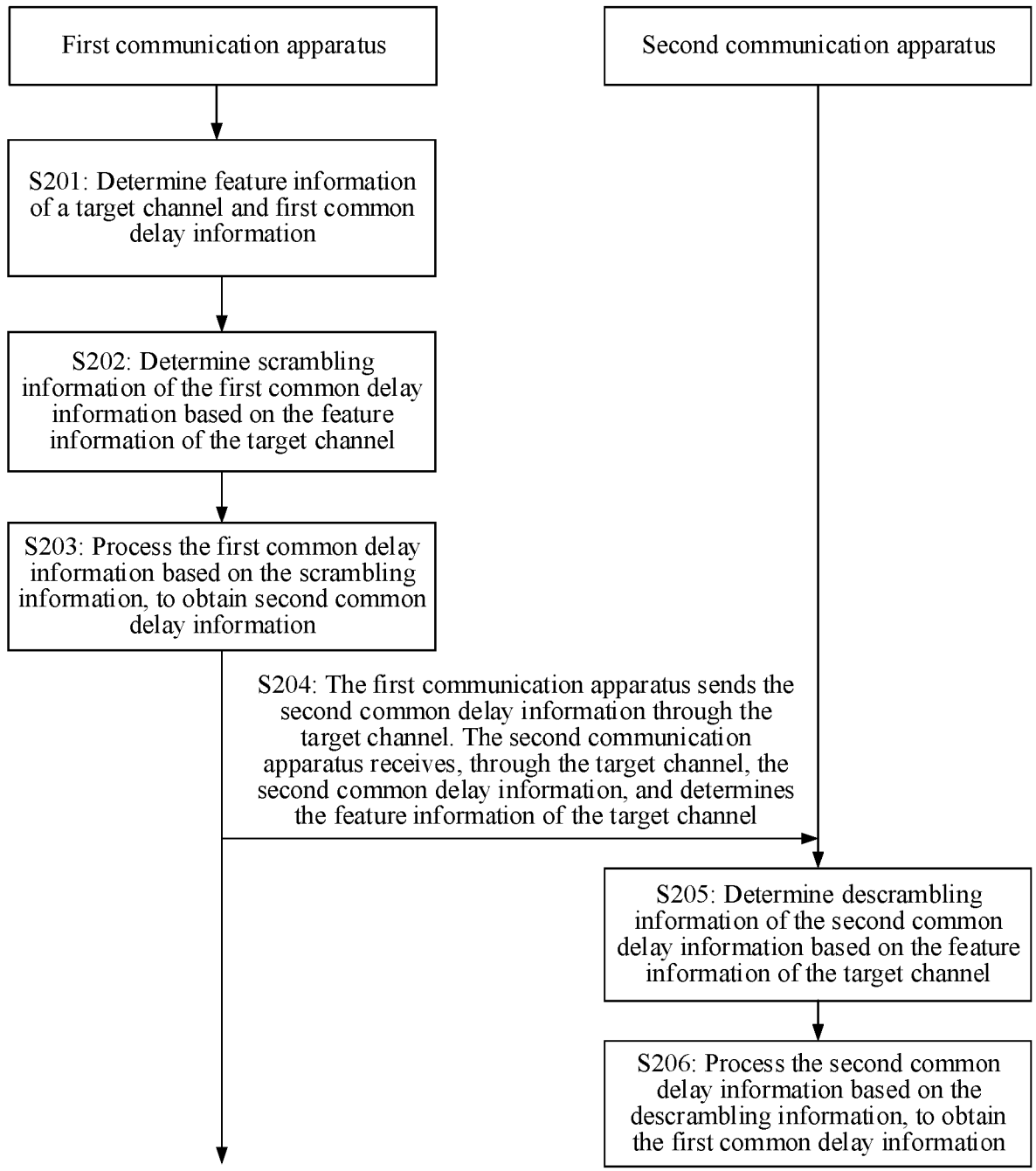
FIG. 2 is a schematic flowchart of an information transmission method according to an embodiment of the present invention.

FIG. 2 is a flowchart of implementation of an information transmission method according to an embodiment of this application. The method may be applied to the communication system shown in FIG. 1A to FIG. 1B, and certainly may also be applied to another non-terrestrial communication system or a terrestrial communication system. This is not limited in this application. Referring to FIG. 2, the method may include the following processing process.

S201: A first communication apparatus determines feature information of a target channel and first common delay information. The first common delay information is minimum common delay information transmitted between the first communication apparatus and a second communication apparatus located within a coverage of a beam of the first communication apparatus.

Optionally, the first communication apparatus may be a communication device in a non-terrestrial network, and a function of the first communication apparatus is similar to a function of a base station in a terrestrial network. For example, the first communication apparatus is a satellite, and the second communication apparatus is a terminal device. The satellite may communicate with an accessed terminal device within a beam range of the satellite.

In an implementation, the first communication apparatus may determine the feature information of the target channel in but not limited to the following manners.

The first communication apparatus obtains direction information and/or Doppler information of the beam of the first communication apparatus, and determines the feature information of the target channel based on the direction information and/or the Doppler information of the beam.

It should be noted that, a change trend of Doppler is related to a position between the satellite and the second communication apparatus. Therefore, when a pseudo satellite exists, a Doppler value and a change value between the pseudo satellite and the second communication apparatus are obviously different from a Doppler value and a change value between the authorized satellite and the second communication apparatus. Therefore, a satellite communication network may determine channel feature information between the satellite and the second communication apparatus based on the Doppler information.

For example, the satellite is used as the first communication apparatus. According to a formula 1 and FIG. 3, it may be learned that there is a correspondence between Doppler of a satellite channel and a beam direction, as well as a track of the satellite. Therefore, when the Doppler information is determined, direction information of the beam may be determined. Conversely, when the direction information of the beam is determined, the Doppler information may be determined.

A Doppler shift $$f_d = f_c * \frac{v_D}{c}.$$

In the formula, $f_c$ represents a carrier frequency. $v_D$ refers to a speed at which the satellite points to a ground terminal, and c refers to a speed of light.

$$v_D = \sqrt{\frac{\mu R_E^2}{(R_E+h)^3}\cos\theta\sin\psi - \frac{2\pi}{86164}R_E\cos l_t\cos\theta\cos\psi} \quad \text{Formula 1}$$

$$\psi = \arctan\left[-\frac{43082}{\pi}\sqrt{\frac{\mu}{(R_E+h)^3}}\right]; R_E = 6356.75 \text{ km},$$

which represents the radius of the earth; $\mu = 398601.58 \times 10^9$ m$^3$/s$^2$, which represents the Kepler constant, $\theta$ represents an elevation angle, and $l_t$ represents a terminal dimension. h represents a height of the satellite from a surface of the earth.

Specifically, when the second communication apparatus accesses a satellite mobile network, track information of the satellite is known, and the track information includes a track height and a track. The satellite knows a beam direction, and performs N-bit quantization on a beam direction angle or Doppler as channel feature information, which may also be a simplest division. For example, eight areas are divided for a direction angle of 0 to 99 degrees, every 12 degrees is an area, and 3-bit channel feature information is outputted in total. Therefore, the 3-bit channel feature information may be used as feature information of a target channel.

S202: The first communication apparatus determines scrambling information of the first common delay information based on the feature information of the target channel.

When step S202 is performed, this application may be specifically implemented in the following two implementations (but not limited to the following two implementations):

In a first implementation, the first communication apparatus determines the scrambling information of the first common delay information based on a gold Gold sequence included in preset scrambling code sequence information. An initial value of the Gold sequence is determined based on the feature information of the target channel and identification information of a cell in which the second communication apparatus is located.

It should be noted that, the foregoing preset scrambling code sequence information may be scrambling sequence information used in a 5G standard, and the scrambling sequence information used in the 5G standard may include the Gold sequence, and may further include another sequence, to implement scrambling/encrypting processing of information or data. This is not specifically limited in this application.

For a Gold sequence generation manner, refer to 3GPP TS38.211 5.2.1 Pseudo-random sequence generation. An initial value of the Gold sequence meets a formula:

C_int=N_ID^cell+v. N represents that an amount of feature information of the target channel that is obtained is N bits, ID represents an identifier of a cell in which the second communication apparatus is located, and v represents the feature information of the target channel. Therefore, N-bit target channel feature information v and the identifier of the cell are inputted to the formula, to determine the initial value of the Gold sequence.

Specifically, the preset scrambling code sequence information includes an N-bit Gold sequence, where N is a positive integer. The first communication apparatus determines that the first common delay information includes M bits, where M is a positive integer. The first communication apparatus may determine an M-bit Gold sequence from the N-bit Gold sequence, and use the M-bit Gold sequence as a scrambling sequence of the first common delay information.

When M is less than N, that is, a quantity of bits of the scrambling sequence of the first common delay information is greater than a quantity of bits of the Gold sequence, the first communication apparatus may randomly select the M-bit Gold sequence from the N-bit Gold sequence, and use the M-bit Gold sequence as the scrambling sequence of the first common delay information.

When M is equal to N, that is, when the quantity of bits of the scrambling sequence of the first common delay information is equal to the quantity of bits of the Gold sequence, the first communication apparatus uses the N-bit Gold sequence as the scrambling sequence of the first common delay information.

When M is greater than N, that is, when the quantity of bits of the scrambling sequence of the first common delay information is less than the quantity of bits of the Gold sequence, the first communication apparatus uses the N-bit Gold sequence as a partial scrambling sequence of the first common delay information. The N-bit Gold sequence may be reused for a remaining partial scrambling sequence of the first common delay information.

For example, when a value of M−N is less than N, that is, a quantity of bits of the remaining partial scrambling sequence of the first common delay information is less than the quantity of bits of the Gold sequence, the first communication apparatus may further randomly select an (M−N)-bit Gold sequence from the N-bit Gold sequence, and use the (M−N)-bit Gold sequence as the remaining partial scrambling sequence of the first common delay information.

In a second implementation, the first communication apparatus first determines corresponding information in a preset first lookup table based on the feature information of the target channel. Then, the first communication apparatus determines the scrambling information of the first common delay information based on the corresponding information in the preset first lookup table and a preset first sequence formula.

Specifically, in a first step, the first communication apparatus first determines, based on a quantity M of bits included in the first common delay information, that a scrambling sequence of the first common delay information needs to include M bits, where M is a positive integer.

In a second step, the first communication apparatus determines, based on that the scrambling sequence of the first common delay information needs to include M bits, that a length of the preset first lookup table is M, where the preset first lookup table includes correspondences between different index values and different preset φ(m) values, each index value corresponds to M different preset φ(m) values, and m is a positive integer less than or equal to M.

In a third step, when determining that the scrambling sequence of the first common delay information needs to include M bits, the first communication apparatus may select first M columns from a lookup sample table used in an existing 5G standard, and use a lookup sample table of the first M columns as the preset first lookup table.

In a fourth step, the first communication apparatus determines, based on the feature information of the target channel, that a corresponding index value in the preset first lookup table is i, where i is a positive integer. The first communication apparatus further determines, in the preset first lookup table, that the index value i corresponds to M different preset φ(m) values.

Specifically, the first communication apparatus may determine, based on the feature information of the target channel, the corresponding index value in the preset first lookup table in the following two manners.

Manner 1: The first communication apparatus determines a corresponding index value based on a mapping relationship S(v, i) between the feature information of the target channel and an index value in the preset first lookup table, where v represents a quantized value of the feature information of the target channel, and i represents the corresponding index value.

Manner 2: A function formula $f(v)$ is known. A calculation input value of the function formula is a quantized value v of the feature information of the target channel. The first communication apparatus may substitute the quantized value v of the feature information of the target channel into the function formula $f(v)$, to obtain an output value through calculation, and use the output value as the corresponding index value in the preset first lookup table.

In a fifth step, the first communication apparatus respectively substitutes the M different preset φ(m) values corresponding to the index value i into the preset first sequence formula, to obtain M sequence values r(m) through calculation, and uses the M sequence values r(m) as an M-bit scrambling sequence of the first common delay information.

For example, in this application, the M-bit scrambling sequence may be generated through 3GPP TS38.211 5.2.2 Low-PAPR sequence generation. A specific sequence may be calculated through the preset first sequence formula. Specifically, the preset first sequence formula may meet the following formula requirements:

$$r(m)=e^{j\phi(m)\pi/4} \quad \text{Formula 2}$$

j is used to represent an imaginary unit in an exponential form of a complex number, and r(m) represents an $m^{th}$ sequence value.

Figures 3, 4:
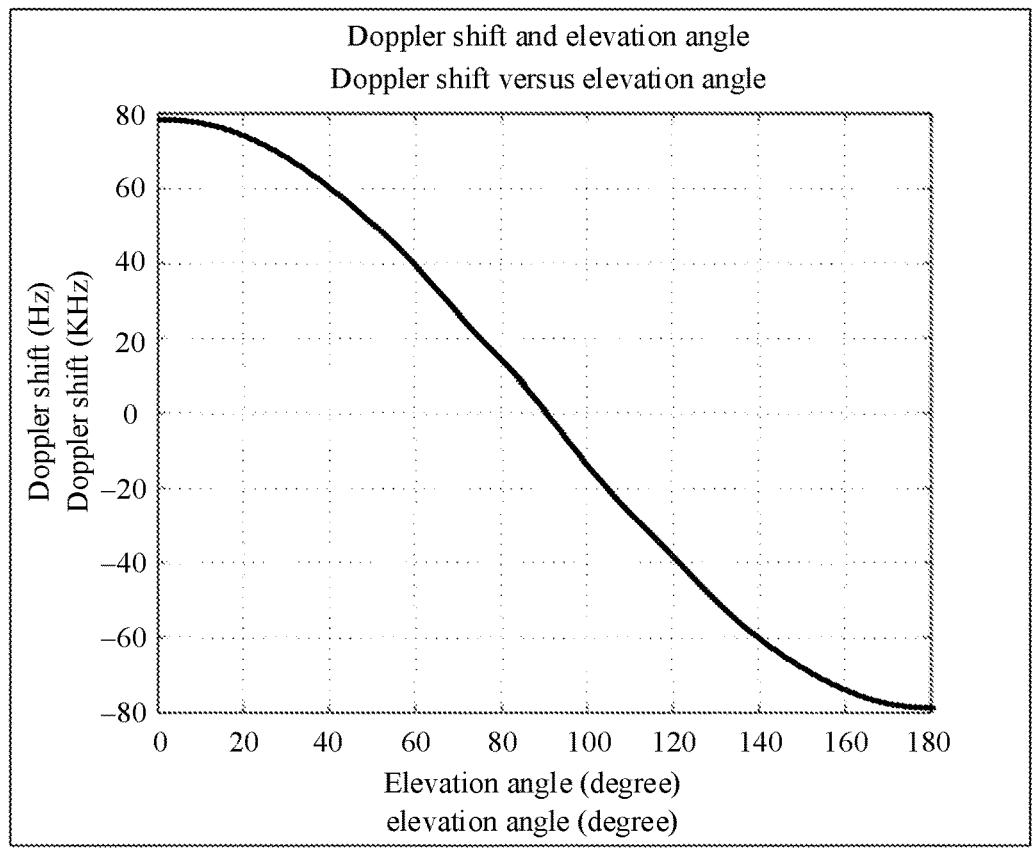
FIG. 3 is a schematic diagram of Doppler and a beam direction of a satellite channel according to an embodiment of the present invention.
FIG. 4 is a schematic diagram of a preset first lookup table according to an embodiment of the present invention.

For example, when M=18, it is determined that the preset first lookup table includes 18 columns. As shown in FIG. 4, when the first communication apparatus determines that the index value is 5 based on the feature information of the target channel, the first communication apparatus determines 18 φ(m) values in a row corresponding to an index value sequence number 5 through the preset first lookup table shown in FIG. 4, respectively substitutes the 18 φ(m) values into the foregoing formula 2 to obtain 18 sequence values, and further uses the 18 sequence values as the scrambling sequence of the first common delay information.

S203: The first communication apparatus processes the first common delay information based on the scrambling information, to obtain second common delay information.

When step S203 is performed, this application may be implemented in the following two implementations (but not limited to the following two implementations):

In a first implementation, the first communication apparatus directly scrambles the first common delay information by using the scrambling sequence of the first common delay information included in the scrambling information, to obtain the second common delay information.

Figure 5A:
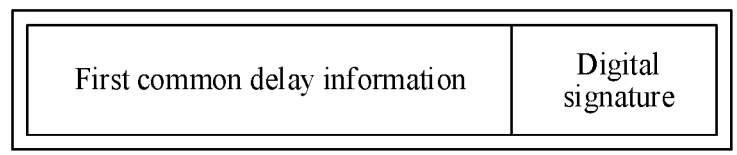
FIG. 5A is a schematic diagram of second common delay information according to an embodiment of the present invention.

In a second implementation, the first communication apparatus obtains a digital signature based on the scrambling information and the first common delay information, and uses the digital signature and the first common delay information as the second common delay information; or the first communication apparatus obtains a digital signature based on the scrambling information and the feature information of the target channel, and uses the digital signature and the first common delay information as the second common delay information. As shown in FIG. 5A, the second common delay information includes the first common delay information and the digital signature.

Figure 5B:
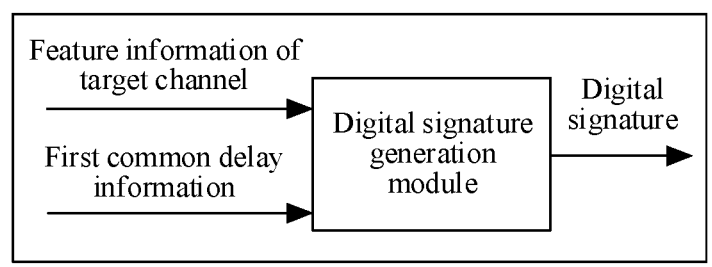
FIG. 5B is a schematic diagram of generating a digital signature according to an embodiment of the present invention.

For the second implementation, as shown in FIG. 5B, the first communication apparatus may include a digital signature generation module, and a corresponding digital signature may be obtained by inputting the feature information of the target channel and the first common delay information into the module.

Specifically, the first communication apparatus may specifically determine the digital signature based on the feature information of the target channel and the first common delay information through the following two examples (not limited to the following two examples).

In a first example, the first communication apparatus determines that the scrambling sequence of the first common delay information is M bits, M is a positive integer, and the first common delay information is represented by x. The first communication apparatus determines a truncation position Ts (Ts is a positive integer less than or equal to M) in the M-bit scrambling sequence based on the first common delay information x and a preset first truncation formula, starts to truncate at a $Ts^{th}$ bit in the M-bit scrambling sequence, obtains an L-bit scrambling sequence between a first bit and the $Ts^{th}$ bit in the M-bit scrambling sequence, where the L-bit scrambling sequence includes a first-bit scrambling sequence and a $Ts^{th}$-bit scrambling sequence, and uses the L-bit scrambling sequence as the digital signature. The preset first truncation formula meets: Ts=x mod M.

For example, the first communication apparatus determines that a quantity M of bits of the scrambling sequence of the first common delay information is 5, that is, a first bit, a second bit, a third bit, a fourth bit, and a fifth bit, and each bit corresponds to one scrambling sequence. The first communication apparatus calculates Ts=3 based on the first common delay information and the preset first truncation formula. In other words, a truncation position of the first communication apparatus in a 5-bit scrambling sequence is a third bit. The first communication apparatus starts to truncate from a third-bit scrambling sequence, obtains three scrambling sequences corresponding to a first bit, a second bit, and a third bit, and uses the three scrambling sequences as the digital signature.

In addition, the first communication apparatus may further obtain the digital signature based on the scrambling information and the first common delay information in the following manner.

The first communication apparatus determines that the first common delay information includes M bits, where M is a positive integer, and may be represented as d(0), d(M−1). The first communication apparatus determines that the scrambling sequence of the first common delay information included in the scrambling information is M bits, that is, represented as r(0), . . . , r(M−1). The first communication apparatus calculates an M-bit generation sequence through a preset first generation formula, and randomly selects L bits from the M-bit generation sequence as the digital signature. The preset first generation formula meets: s(m)=(r(m)+d(m)) mod 2. m is a positive integer less than or equal to M.

For example, the first communication apparatus determines that the first common delay information includes 5 bits, which may be represented as d(1), d(2), d(3), d(4), and d(5). 5 bits of the scrambling sequence of the first common delay information included in the scrambling information are respectively represented as r(1), r(2), r(3), r(4), and r(5). 5 bits of a generation sequence calculated through the preset first generation formula are respectively s(1), s(2), s(3), s(4), and s(5). The first communication apparatus randomly selects L-bit generation sequences from the generation sequence as the digital signature (L is a positive integer less than or equal to 5). A specific value of L may be determined based on an actual requirement.

In a second example, the first communication apparatus determines that the scrambling sequence of the first common delay information included in the scrambling information is M bits, and the feature information of the target channel is represented by v. The first communication apparatus determines a truncation position Ts (Ts is less than or equal to M) in the M-bit scrambling sequence based on the feature information v of the target channel and a preset second truncation formula, starts to truncate at a $Ts^{th}$ bit in the M-bit scrambling sequence, obtains an L-bit scrambling sequence between a first bit and the $Ts^{th}$ bit in the M-bit scrambling sequence, where the L-bit scrambling sequence includes a first-bit scrambling sequence and a $Ts^{th}$-bit scrambling sequence, and uses the L-bit scrambling sequence as the digital signature. The preset second truncation formula meets: Ts=v mod M.

For example, the first communication apparatus determines that a quantity M of bits of the scrambling sequence of the first common delay information is 6, that is, a first bit, a second bit, a third bit, a fourth bit, a fifth bit, and a sixth bit, and each bit corresponds to one scrambling sequence. The first communication apparatus calculates Ts=2 based on the feature information of the target channel and the preset first truncation formula. In other words, a truncation position of the first communication apparatus in a 5-bit scrambling sequence is a second bit. The first communication apparatus starts to truncate from a second-bit scrambling sequence, obtains two scrambling sequences corresponding to a first bit and a second bit, and uses the two scrambling sequences as signature numbers.

S204: The first communication apparatus sends the second common delay information through the target channel. The second communication apparatus receives, through the target channel, the second common delay information sent by the first communication apparatus, and determines the feature information of the target channel.

In an implementation, the second communication apparatus may determine the feature information of the target channel in the following manners.

The second communication apparatus measures the target channel by sending a reference signal such as a channel-state information reference signal (channel-state information reference signal, CSI-RS) or an uplink sounding reference signal (sounding reference signal, SRS) to the first communication apparatus through the target channel, to obtain a measurement result of the target channel. The second communication apparatus determines the feature information of the target channel based on the measurement result of the target channel. For example, the second communication apparatus may use the measurement result of the target channel as the feature information of the target channel.

Optionally, the second communication apparatus may further estimate a frequency offset by monitoring a downlink pilot, for example, a primary synchronization signal (Primary Synchronization Signal, PSS)/a secondary synchronization signal (Secondary Synchronization signal, SSS), to estimate a feature of the target channel, and further determine the feature information of the target channel.

It should be noted that, the feature information of the target channel determined by the second communication apparatus and the feature information of the target channel determined by the first communication apparatus are mainly feature information of a same channel determined by different apparatuses or devices. If data included in the feature information of the target channel determined by the second communication apparatus is closer to data included in the feature information determined by the first communication apparatus, accuracy of determining descrambling information by the second communication apparatus is higher.

S205: The second communication apparatus determines the descrambling information based on the feature information of the target channel.

The second communication apparatus may determine the descrambling information based on the feature information of the target channel in the following two implementations (but not limited to the following two implementations). For details, refer to step S202.

In a first implementation, the second communication apparatus may determine the descrambling information based on a gold Gold sequence included in preset scrambling code sequence information, where an initial value of the Gold sequence is determined based on the feature information of the target channel and identification information of a cell in which the second communication apparatus is located. Specifically, refer to a process in which the first communication apparatus determines the scrambling information based on the feature information of the target channel in the first implementation of step S202. Details are not described herein again.

In a second implementation, the second communication apparatus determines the descrambling information based on the feature information of the target channel, the preset first lookup table, and the preset first sequence formula. Specifically, refer to a process in which the first communication apparatus determines the scrambling information based on the feature information of the target channel in the second implementation of step S202. Details are not described herein again.

S206: The second communication apparatus processes the second common delay information based on the descrambling information, to obtain first common delay information, where the first common delay information is minimum common delay information transmitted between the first communication apparatus and a second communication apparatus located within a coverage of a beam of the first communication apparatus.

There may be two cases for the second common delay information received by the second communication apparatus.

In a first case, the first communication apparatus directly scrambles the first common delay information based on the scrambling information to obtain the second common delay information. In this case, the descrambling information includes a descrambling sequence, and the second communication apparatus may directly descramble the second common delay information by using the descrambling sequence, to obtain the first common delay information.

In a second case, the second common delay information includes delay information and a first digital signature. In this case, the descrambling information includes the descrambling sequence. The second communication apparatus first uses the descrambling sequence as a scrambling sequence of the delay information included in the second common delay information. Then, the second communication apparatus generates a second digital signature based on the delay information included in the second common delay information and the scrambling sequence of the delay information, or the second communication apparatus generates the second digital signature based on the feature information of the target channel and the scrambling sequence of the delay information. For a manner in which the second communication apparatus generates the second digital signature, refer to a process in which the first communication apparatus obtains the digital signature based on the delay information and the scrambling sequence in step S203. Details are not described herein again.

Finally, the second communication apparatus compares the generated second digital signature with the first digital signature included in the second common delay information. When the second digital signature is the same as the first digital signature, the second communication apparatus determines that the delay information included in the second common delay information is the first common delay information. When the second digital signature is different from the first digital signature, the second communication apparatus determines that the delay information included in the second common delay information is incorrect first common delay information and is not used by the second communication apparatus.

In summary, in this embodiment of this application, the first communication apparatus first determines the feature information of the target channel and the first common delay information, and then determines the scrambling information of the first common delay information based on the feature information of the target channel. Then, the first communication apparatus processes the first common delay information based on the scrambling information, to obtain the second common delay information. Finally, the first communication apparatus sends the second common delay information through the target channel. After receiving the second common delay information through the target channel, a second communication apparatus measures the target channel, to obtain the feature information of the target channel, then determines descrambling information based on the feature information of the target channel, and further processes the second common delay information based on the descrambling information to obtain the first common delay information. In this solution, both the first communication apparatus and the second communication apparatus determine corresponding scrambling information and descrambling information based on channel feature information between the first communication apparatus and the second communication apparatus, to ensure security of transmission of the first common delay information, and ensure that the second communication apparatus receives correct first common delay information, to accurately access the first communication apparatus for communication.

Based on a same technical concept, an embodiment of this application further provides an information transmission apparatus. The information transmission apparatus has a behavior function of the first communication apparatus or the second communication apparatus in the foregoing method embodiments. The communication apparatus may include a corresponding module or unit for performing the methods/operations/steps/actions described in the foregoing method embodiments. The module or unit may be a hardware circuit, or may be software, or may be implemented by a hardware circuit in combination with software. The apparatus may have a structure as shown in FIG. 6.

Figure 6:
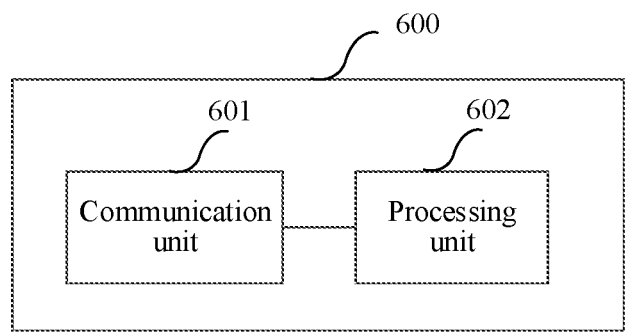
FIG. 6 is a schematic diagram of a structure of an information transmission apparatus according to an embodiment of the present invention.

As shown in FIG. 6, an apparatus 600 may include a communication unit 601 and a processing unit 602. The following describes each unit in detail.

When the information transmission apparatus is a first communication apparatus, the processing unit 602 may be configured to determine feature information of a target channel and first common delay information, where the first common delay information is minimum common delay information transmitted between the first communication apparatus and a second communication apparatus located within a coverage of a beam of the first communication apparatus. Then the processing unit 602 may determine scrambling information of the first common delay information based on the feature information of the target channel, and further process the first common delay information based on the scrambling information, to obtain second common delay information. The communication unit 601 may be configured to send the second common delay information through the target channel.

In a possible design, when determining the feature information of the target channel, the processing unit 602 may specifically obtain direction information and/or Doppler information of the beam through the communication unit 601, and then determine the feature information of the target channel based on the direction information and/or the Doppler information of the beam.

In a possible design, when determining the scrambling information of the first common delay information based on the feature information of the target channel, the processing unit 602 may specifically determine the scrambling information of the first common delay information based on a gold Gold sequence included in preset scrambling code sequence information. An initial value of the Gold sequence may be determined based on the feature information of the target channel and identification information of a cell in which the second communication apparatus is located.

In a possible design, the preset scrambling code sequence information includes an N-bit Gold sequence, where N is a positive integer. When determining the scrambling information of the first common delay information based on the Gold sequence, the processing unit 602 may specifically first determine that the first common delay information includes M bits, where M is a positive integer; and then determine an M-bit Gold sequence from the N-bit Gold sequence, and uses the M-bit Gold sequence as a scrambling sequence of the first common delay information.

In a possible design, when determining the scrambling information of the first common delay information based on the feature information of the target channel, the processing unit 602 may specifically determine the scrambling information of the first common delay information based on the feature information of the target channel, a preset first lookup table, and a preset first sequence formula.

In a possible design, when determining the scrambling information of the first common delay information based on the feature information of the target channel, the preset first lookup table, and the preset first sequence formula, the processing unit 602 may specifically determine, based on a quantity M of bits included in the first common delay information, that the scrambling sequence of the first common delay information needs to include M bits, where M is a positive integer; then determine, based on that the scrambling sequence of the first common delay information needs to include M bits, that a length of the preset first lookup table is M, where the preset first lookup table includes correspondences between different index values and different preset $\phi(m)$ values, each index value corresponds to M different preset $\phi(m)$ values, and m is a positive integer less than or equal to M; then determine, based on the feature information of the target channel, that a corresponding index value in the preset first lookup table is i, where i is an integer greater or equal to 0; determine, in the preset first lookup table, M different preset $\phi(m)$ values corresponding to the index value i; and finally respectively substitute the M different preset $\phi(m)$ values corresponding to the index value i into the preset first sequence formula, to obtain M sequence values r(m) through calculation, and use the M sequence values r(m) as an M-bit scrambling sequence of the first common delay information.

The preset first sequence formula may meet the following:

$$r(m)=e^{j\phi(m)\pi/4}.$$

j is used to represent an imaginary unit in an exponential form of a complex number, and r(m) represents an $m^{th}$ sequence value.

In a possible design, when the scrambling information includes the scrambling sequence of the first common delay information, when processing the first common delay information based on the scrambling information, to obtain the second common delay information, the processing unit 602 may specifically use the scrambling sequence of the first common delay information to scramble the first common delay information, to obtain the second common delay information.

In a possible design, when processing the first common delay information based on the scrambling information to obtain the second common delay information, the processing unit 602 may specifically obtain a digital signature based on the scrambling information and the first common delay information, and then use the digital signature and the first common delay information as the second common delay information; or may further obtain a digital signature based on the scrambling information and the feature information of the target channel, and then use the digital signature and the first common delay information as the second common delay information.

When the information transmission apparatus is the second communication apparatus, the communication unit 601 is configured to receive, through the target channel, the second common delay information sent by the first communication apparatus, and determine the feature information of the target channel.

The processing unit 602 is configured to determine descrambling information based on the feature information of the target channel; and then process the second common delay information based on the descrambling information, to obtain first common delay information, where the first common delay information may be minimum common delay information transmitted between the first communication apparatus and a second communication apparatus located within a coverage of a beam of the first communication apparatus.

In a possible design, when determining the feature information of the target channel, the processing unit 602 may specifically send a reference signal to the first communication apparatus through the target channel, and then measure the target channel, to obtain a measurement result of the target channel; and further determine the feature information of the target channel based on the measurement result of the target channel.

In a possible design, when determining the descrambling information of the second common delay information based on the feature information of the target channel, the processing unit 602 may first specifically determine the descrambling information of the second common delay information based on a gold Gold sequence included in preset scrambling code sequence information. An initial value of the Gold sequence may be determined based on the feature information of the target channel and identification information of a cell in which the second communication apparatus is located.

In a possible design, the preset scrambling code sequence information includes an N-bit Gold sequence, where N is a positive integer. When determining the descrambling information based on the Gold sequence included in the preset scrambling code sequence information, the processing unit 602 may specifically first determine that the first common delay information includes M bits, where M is a positive integer; and then determine an M-bit Gold sequence from the N-bit Gold sequence, and further use the M-bit Gold sequence as a descrambling sequence.

In a possible design, when determining the descrambling information based on the feature information of the target channel, the processing unit 602 may specifically determine the descrambling information based on the feature information of the target channel, a preset first lookup table, and a preset first sequence formula.

In a possible design, when determining the descrambling information based on information corresponding to the preset first lookup table and the preset first sequence formula, the processing unit 602 may specifically first determine that the descrambling sequence needs to include M bits based on a quantity M of bits included in the first common delay information, where M is an integer greater than 0; determine, based on that the descrambling sequence needs to include M bits, that a length of the preset first lookup table is M, where the preset first lookup table includes correspondences between different index values and different preset φ(m) values, each index value corresponds to M different preset φ(m) values, and m is a positive integer less than or equal to M; further determine, based on the feature information of the target channel, that a corresponding index value in the preset first lookup table is i, where i is a positive integer; determine, in the preset first lookup table, M different preset φ(m) values corresponding to the index value i; and finally respectively substitute the M different preset φ(m) values corresponding to the index value i into the preset first sequence formula, to obtain M sequence values r(m) through calculation, and use the M sequence values r(m) as an M-bit descrambling sequence.

The preset first sequence formula may meet the following:

$$r(m) = e^{j \phi(m) \pi / 4}.$$

j is used to represent an imaginary unit in an exponential form of a complex number, and r(m) represents an $m^{th}$ sequence value.

In a possible design, the descrambling information includes the descrambling sequence.

When processing the second common delay information based on the descrambling information to obtain the first common delay information, the processing unit 602 may specifically descramble the second common delay information by using the descrambling sequence, to obtain the first common delay information.

In a possible design, the second common delay information includes delay information and a first digital signature, and the descrambling information includes the descrambling sequence. When processing the second common delay information based on the descrambling information to obtain the first common delay information, the processing unit 602 may specifically first use the descrambling sequence as a scrambling sequence of the delay information; then generate a second digital signature based on the delay information and the scrambling sequence of the delay information, or may further generate a second digital signature based on the feature information of the target channel and the scrambling sequence of the delay information; and when the second digital signature is the same as the first digital signature, determine that delay information included in the second common delay information is the first common delay information.

Figure 7:
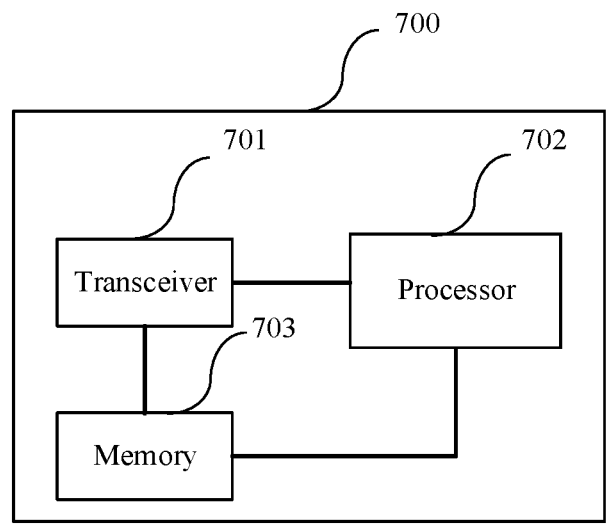
FIG. 7 is a schematic diagram of a structure of an information transmission device according to an embodiment of the present invention.

In addition, an embodiment of this application further provides an information transmission device. The device may have a structure shown in FIG. 7, and has a behavior function of the first communication apparatus or the second communication apparatus in the foregoing method embodiments. An information transmission device 700 shown in FIG. 7 may include at least one processor 702, and the at least one processor 702 is configured to be coupled to a memory 703 (the memory 703 in this embodiment of this application may not be limited to this coupling form, and may exist in another form, for example, the memory 703 is arranged to be separate from the at least one processor 702, or is arranged outside the apparatus 700), and read and execute instructions in the memory 703, to implement steps related to the first communication apparatus or the second communication apparatus in the methods provided in embodiments of this application. Optionally, the apparatus 700 may further include a transceiver 701, and the transceiver 701 is configured to support the apparatus 700 in receiving or sending signaling or information.

When the transmission device is used as the first communication apparatus, the transceiver 701 in the apparatus 700 may be configured to implement functions of the communication unit 601 of the first communication apparatus in FIG. 6. For example, the transceiver 701 may be used by the apparatus 700 to perform the steps shown in S204 in the information transmission method shown in FIG. 2. The processor 702 may be configured to implement functions of the processing unit 602 of the first communication apparatus in FIG. 6. For example, the processor 702 may be used by the apparatus 700 to perform the steps shown in S201 to S203 in the information transmission method shown in FIG. 2. Optionally, the apparatus 700 may further include the memory 703, where the memory 703 stores a computer program and instructions. The memory 703 may be coupled to the processor 702 and/or the transceiver 701, to support the processor 702 in invoking the computer program and the instructions in the memory 703, to implement the steps related to the first communication apparatus in the method provided in embodiments of this application. In addition, the memory 703 may be further configured to store information or data in method embodiments of this application, for example, configured to store data, information, and instructions that are necessary for supporting the transceiver 701 in implementing interaction; and/or configured to store configuration information necessary for the apparatus 700 to perform the method in this embodiment of this application.

When the transmission device is used as the second communication apparatus, the transceiver 701 in the apparatus 700 may be configured to implement functions of the communication unit 601 of the second communication apparatus in FIG. 6. For example, the transceiver 701 may be used by the apparatus 700 to perform the steps shown in S204 in the information transmission method shown in FIG. 2. The processor 702 may be configured to implement functions of the processing unit 602 of the second communication apparatus in FIG. 6. For example, the processor 702 may be used by the apparatus 700 to perform the steps shown in S205 to S206 in the information transmission method shown in FIG. 2. Optionally, the apparatus 700 may further include the memory 703, where the memory 703 stores a computer program and instructions. The memory 703 may be coupled to the processor 702 and/or the transceiver 701, to support the processor 702 in invoking the computer program and the instructions in the memory 703, to implement the steps related to the second communication apparatus in the method provided in embodiments of this application. In addition, the memory 703 may be further configured to store information or data in method embodiments of this application, for example, configured to store data, instructions, and information that are necessary for supporting the transceiver 701 in implementing interaction; and/or configured to store configuration information necessary for the apparatus 700 to perform the method in this embodiment of this application.

Figure 8:
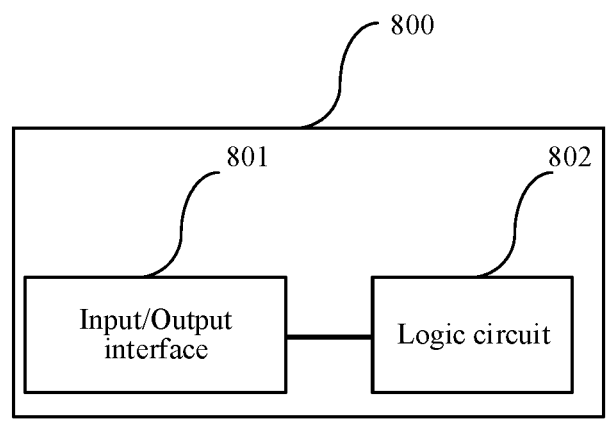
FIG. 8 is a schematic diagram of a structure of an information transmission apparatus according to an embodiment of the present invention.

An embodiment of this application further provides an information transmission apparatus 800. The apparatus may have a structure shown in FIG. 8. The apparatus 800 may be configured to implement functions of the first communication apparatus or the second communication apparatus in the foregoing methods. The apparatus 800 may alternatively be a chip in the first communication apparatus or the second communication apparatus. The communication apparatus 800 includes:

at least one input/output interface 801 and a logic circuit 802. The input/output interface 801 may be an input/output circuit. The logic circuit 802 may be a signal processor, a chip, or another integrated circuit that can implement the method in this application.

The at least one input/output interface 801 is configured to input/output a signal or data. For example, when the apparatus is used as the first communication apparatus or is used for the first communication apparatus, the input/output interface 801 is configured to output first beam configuration information, and the input/output interface 801 may be further configured to obtain second beam configuration information sent by a core network element. When the apparatus is used as the second communication apparatus or is used for the second communication apparatus, the input/output interface 801 is configured to input the first beam configuration information, and the input/output interface 801 may be further configured to output a random access request.

The logic circuit 802 is configured to perform some or all steps of any method provided in embodiments of this application. The logic circuit may implement functions implemented by the processing unit 601 in the apparatus 600 and the processor 701 in the apparatus 700. For example, when the apparatus is used as the first communication apparatus or is used for the first communication apparatus, the apparatus is configured to perform steps performed by the first communication apparatus in various possible implementation methods in the foregoing method embodiments. For example, the logic circuit 802 is configured to determine the first beam configuration information. When the apparatus is used as the second communication apparatus or used for the second communication apparatus, the apparatus is configured to perform steps performed by the second communication apparatus in various possible implementations in the foregoing method embodiments. For example, the logic circuit 802 is configured to determine a mode of a first beam based on the first beam configuration information, to implement communication with the first communication apparatus.

Based on a same technical concept as that in the foregoing method embodiments, an embodiment of this application further provides a computer-readable storage medium. The computer-readable storage medium stores some instructions. When these instructions are invoked and executed by a computer, the computer may be enabled to perform the method in any one of the foregoing method embodiments or possible designs of the foregoing method embodiments. In this embodiment of this application, the computer-readable storage medium is not limited. For example, the computer-readable storage medium may be a RAM (random-access memory), a ROM (read-only memory), or the like.

Based on a same technical concept as that in the foregoing method embodiments, this application further provides a computer program product. When invoked and executed by a computer, the computer program product may implement the method in the method embodiments and any possible design of the foregoing method embodiments.

Based on a same technical concept as that in the foregoing method embodiments, this application further provides a chip. The chip may include a processor and an interface circuit. The processor is configured to obtain computer program instructions and data through the interface circuit, to complete the method in any one of the foregoing method embodiments or possible implementations of the foregoing method embodiments. "Coupling" means that two components are directly or indirectly combined with each other, and this combination may be fixed or movable. This combination may allow flowing liquid, electricity, a electrical signal or another type of signal to perform communication between the two components.

Through descriptions of the foregoing implementations, a person skilled in the art may clearly understand that embodiments of this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a computer. Examples of the computer-readable medium include but are not limited to: a RAM, a ROM, an electrically erasable programmable read only memory (EEPROM), a compact disc read-only memory (CD-ROM) or another optical disc storage, a disk storage medium or another disk storage device, or any other medium that can be used to carry or store expected program code in an instruction or data structure form and can be accessed by a computer. In addition, any connection may be appropriately defined as a computer-readable medium. For example, if software is transmitted from a website, a server or another remote source by using a coaxial cable, an optical fiber cable, a twisted pair, a digital subscriber line (DSL) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and a disc used in embodiments of this application include a compact disc (CD), a laser disc, an optical disc, a digital video disc (DVD), a floppy disk and a Blu-ray disc. The disk generally copies data by a magnetic means, and the disc copies data optically by a laser means. The foregoing combination should also be included in the protection scope of the computer-readable medium.

In a word, the foregoing descriptions are merely embodiments of this application and are not intended to limit the protection scope of this application. Any modification, equivalent substitution, and improvement made based on the disclosure of this application shall fall within the protection scope of this application.

What is claimed is:

1. An information transmission method, wherein the method comprises:
   determining, by a first communication apparatus, feature information of a target channel and first common delay information, wherein the first common delay information is minimum common delay information transmitted between the first communication apparatus and a second communication apparatus located within a coverage of a beam of the first communication apparatus;
   determining, by the first communication apparatus, scrambling information of the first common delay information based on the feature information of the target channel;
   processing, by the first communication apparatus, the first common delay information based on the scrambling information, to obtain second common delay information; and
   sending, by the first communication apparatus, the second common delay information through the target channel to the second communication apparatus.

2. The method according to claim 1, wherein the determining, by a first communication apparatus, feature information of a target channel comprises:
   obtaining, by the first communication apparatus, at least one of direction information and Doppler information of the beam, and determining the feature information of the target channel based on the at least one of the direction information and the Doppler information of the beam.

3. The method according to 1, wherein the determining, by the first communication apparatus, scrambling information of the first common delay information based on the feature information of the target channel comprises:
   determining, by the first communication apparatus, the scrambling information of the first common delay information based on a Gold sequence comprised in preset scrambling code sequence information, wherein an initial value of the Gold sequence is determined based on the feature information of the target channel and identification information of a cell in which the second communication apparatus is located.

4. The method according to claim 3, wherein the preset scrambling code sequence information comprises an N-bit Gold sequence, wherein N is a positive integer; and
   the determining, by the first communication apparatus, the scrambling information of the first common delay information based on the Gold sequence comprises:
   determining, by the first communication apparatus, that the first common delay information comprises M bits, wherein M is a positive integer; and
   determining, by the first communication apparatus, an M-bit Gold sequence from the N-bit Gold sequence, and using the M-bit Gold sequence as a scrambling sequence of the first common delay information.

5. The method according to claim 1, wherein the determining, by the first communication apparatus, scrambling information of the first common delay information based on the feature information of the target channel comprises:
   determining, by the first communication apparatus, the scrambling information of the first common delay information based on the feature information of the target channel, a preset first lookup table, and a preset first sequence formula.

6. The method according to claim 5, wherein the determining, by the first communication apparatus, the scrambling information of the first common delay information based on the feature information of the target channel, a preset first lookup table, and a preset first sequence formula comprises:
   determining, by the first communication apparatus based on a quantity M of bits comprised in the first common delay information, that a scrambling sequence of the first common delay information needs to comprise M bits, wherein M is a positive integer;
   determining, by the first communication apparatus based on that the scrambling sequence of the first common delay information needs to comprise M bits, that a length of the preset first lookup table is M, wherein the preset first lookup table comprises a correspondence between an index value and a preset φ(m) value, each index value corresponds to M different preset φ(m) values, and m is a positive integer less than or equal to M;
   determining, by the first communication apparatus based on the feature information of the target channel, that a corresponding index value in the preset first lookup table is i, wherein i is a positive integer;
   determining, by the first communication apparatus in the preset first lookup table, M different preset φ(m) values corresponding to the index value i; and
   respectively substituting, by the first communication apparatus, the M different preset φ(m) values corresponding to the index value i into the preset first sequence formula, to obtain M sequence values r(m) through calculation, and using the M sequence values r(m) as an M-bit scrambling sequence of the first common delay information, wherein
   the preset first sequence formula meets:

$$r(m)=e^{j\phi(m)\pi/4},$$

wherein j is used to represent an imaginary unit in an exponential form of a complex number, and r(m) represents an $m^{th}$ sequence value.

7. The method according to claim 1, wherein the scrambling information comprises the scrambling sequence of the first common delay information; and
   the processing, by the first communication apparatus, the first common delay information based on the scrambling information, to obtain second common delay information comprises:
   scrambling, by the first communication apparatus, the first common delay information by using the scrambling sequence of the first common delay information, to obtain the second common delay information.

8. The method according to claim 1, wherein the processing, by the first communication apparatus, the first common delay information based on the scrambling information, to obtain second common delay information comprises one of:
  obtaining, by the first communication apparatus, a first digital signature based on the scrambling information and the first common delay information, and using the first digital signature and the first common delay information as the second common delay information; or
  obtaining, by the first communication apparatus, a second digital signature based on the scrambling information and the feature information of the target channel, and using the second digital signature and the first common delay information as the second common delay information.

9. An information transmission method, wherein the method comprises:
  receiving, by a second communication apparatus through a target channel, second common delay information sent by a first communication apparatus, and determining feature information of the target channel;
  determining, by the second communication apparatus, descrambling information based on the feature information of the target channel; and
  processing, by the second communication apparatus, the second common delay information based on the descrambling information, to obtain first common delay information, wherein the first common delay information is minimum common delay information transmitted between the first communication apparatus and a second communication apparatus located within a coverage of a beam of the first communication apparatus.

10. The method according to claim 9, wherein the determining, by the second communication apparatus, the feature information of the target channel comprises:
  sending, by the second communication apparatus, a reference signal to the first communication apparatus through the target channel, and measuring the target channel, to obtain a measurement result of the target channel; and
  determining, by the second communication apparatus, the feature information of the target channel based on the measurement result of the target channel.

11. The method according to claim 9, wherein the determining, by the second communication apparatus, descrambling information based on the feature information of the target channel comprises:
  determining, by the second communication apparatus, the descrambling information based on a Gold sequence comprised in preset scrambling code sequence information, wherein an initial value of the Gold sequence is determined based on the feature information of the target channel and identification information of a cell in which the second communication apparatus is located.

12. The method according to claim 11, wherein the preset scrambling code sequence information comprises an N-bit Gold sequence, wherein N is a positive integer; and
  the determining, by the second communication apparatus, the descrambling information based on a Gold sequence comprised in preset scrambling code sequence information comprises:
  determining, by the second communication apparatus, that the first common delay information comprises M bits, wherein M is a positive integer; and
  determining, by the second communication apparatus, an M-bit Gold sequence from the N-bit Gold sequence, and using the M-bit Gold sequence as a descrambling sequence.

13. The method according to claim 9, wherein the determining, by the second communication apparatus, descrambling information based on the feature information of the target channel comprises:
  determining, by the second communication apparatus, the descrambling information based on the feature information of the target channel, a preset first lookup table, and a preset first sequence formula.

14. The method according to claim 13, wherein the determining, by the second communication apparatus, the descrambling information based on the feature information of the target channel, a preset first lookup table, and a preset first sequence formula comprises:
  determining, by the second communication apparatus based on a quantity M of bits comprised in the first common delay information, that a descrambling sequence needs to comprise M bits, wherein M is a positive integer;
  determining, by the second communication apparatus based on that the descrambling sequence needs to comprise M bits, that a length of the preset first lookup table is M, wherein the preset first lookup table comprises correspondences between different index values and different preset $\phi(m)$ values, each index value corresponds to M different preset $\phi(m)$ values, and m is a positive integer less than or equal to M;
  determining, by the second communication apparatus based on the feature information of the target channel, that a corresponding index value in the preset first lookup table is i, wherein i is a positive integer;
  determining, by the second communication apparatus in the preset first lookup table, M different preset $\phi(m)$ values corresponding to the index value i; and
  respectively substituting, by the second communication apparatus, the M different preset $\phi(m)$ values corresponding to the index value i into the preset first sequence formula, to obtain M sequence values r(m) through calculation, and using the M sequence values r(m) as an M-bit descrambling sequence, wherein the preset first sequence formula meets the following:

$$r(m)=e^{j\phi(m)\pi/4},$$

wherein j is used to represent an imaginary unit in an exponential form of a complex number, and r(m) represents an $m^{th}$ sequence value.

15. The method according to claim 9, wherein the descrambling information comprises a descrambling sequence; and
  the processing, by the second communication apparatus, the second common delay information based on the descrambling information, to obtain first common delay information comprises:
  descrambling, by the second communication apparatus, the second common delay information by using the descrambling sequence, to obtain the first common delay information.

16. The method according to claim 9, wherein the second common delay information comprises delay information and a first digital signature, and the descrambling information comprises a descrambling sequence; and
  the processing, by the second communication apparatus, the second common delay information based on the descrambling information, to obtain first common delay information comprises:
  using, by the second communication apparatus, the descrambling sequence as a scrambling sequence of the delay information;

generating, by the second communication apparatus, a second digital signature based on the delay information and the scrambling sequence of the delay information, or generating, by the second communication apparatus, a second digital signature based on the feature information of the target channel and the scrambling sequence of the delay information; and when the second digital signature is the same as the first digital signature, determining, by the second communication apparatus, that delay information comprised in the second common delay information is the first common delay information.

17. A first communication apparatus, wherein the first communication apparatus comprises:
a processor;
and a non-transitory computer memory storing instructions that when executed by the processor, cause the first communication apparatus to perform steps comprising:
determine feature information of a target channel and first common delay information, wherein the first common delay information is minimum common delay information transmitted between the first communication apparatus and a second communication apparatus located within a coverage of a beam of the first communication apparatus;
determine scrambling information of the first common delay information based on the feature information of the target channel, and process the first common delay information based on the scrambling information, to obtain second common delay information; and
send the second common delay information through the target channel.

18. The first communication apparatus according to claim 17, wherein when determining the feature information of the target channel, further includes:
obtain at least one of direction information and Doppler information of the beam, and determine the feature information of the target channel based on the at least one of the direction information and the Doppler information of the beam.

19. The first communication apparatus according to claim 17, wherein when determining the scrambling information of the first common delay information based on the feature information of the target channel, the steps further include:
determine the scrambling information of the first common delay information based on a Gold sequence comprised in preset scrambling code sequence information, wherein an initial value of the Gold sequence is determined based on the feature information of the target channel and identification information of a cell in which the second communication apparatus is located.

20. The first communication apparatus according to claim 19, wherein the preset scrambling code sequence information comprises an N-bit Gold sequence, wherein N is a positive integer; and
when determining the scrambling information of the first common delay information based on the Gold sequence, the processing unit is specifically configured to:
determine that the first common delay information comprises M bits, wherein M is a positive integer; and
determine an M-bit Gold sequence from the N-bit Gold sequence, and use the M-bit Gold sequence as a scrambling sequence of the first common delay information.

\* \* \* \* \*